July 24, 1934.　　T. V. BUCKWALTER　　1,967,807
RAILWAY TRUCK CONSTRUCTION
Filed Feb. 18, 1933　　2 Sheets-Sheet 2
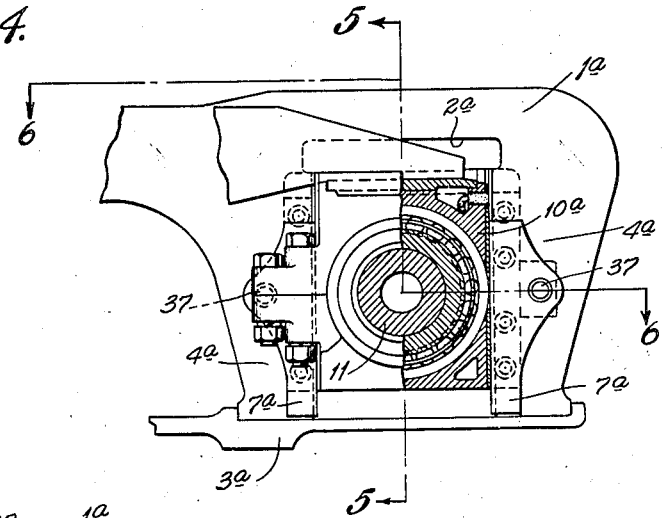
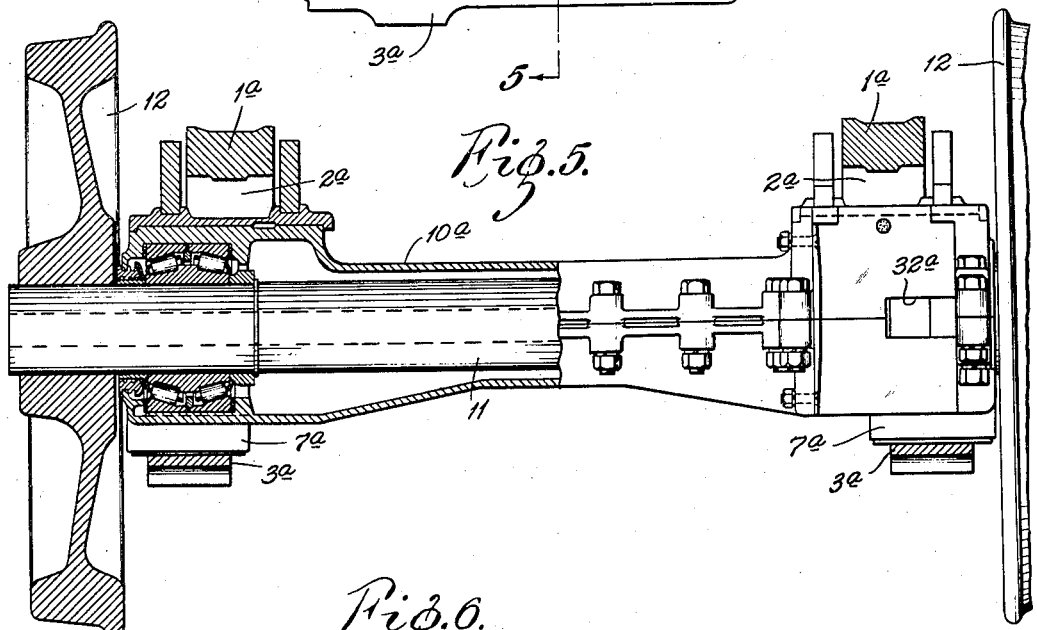
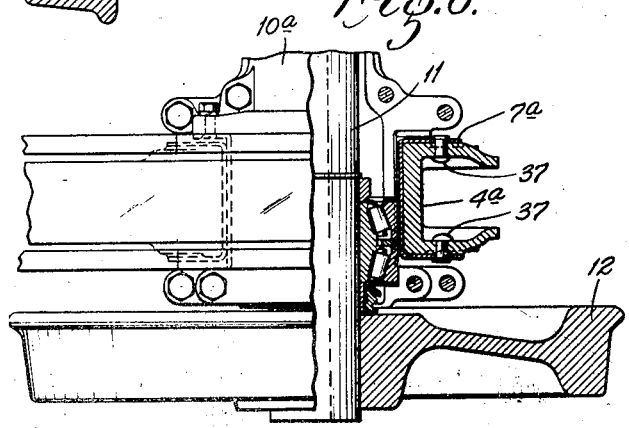
INVENTOR:
Tracy V. Buckwalter,
by Carr, Kerr & Gravely,
HIS ATTORNEYS.

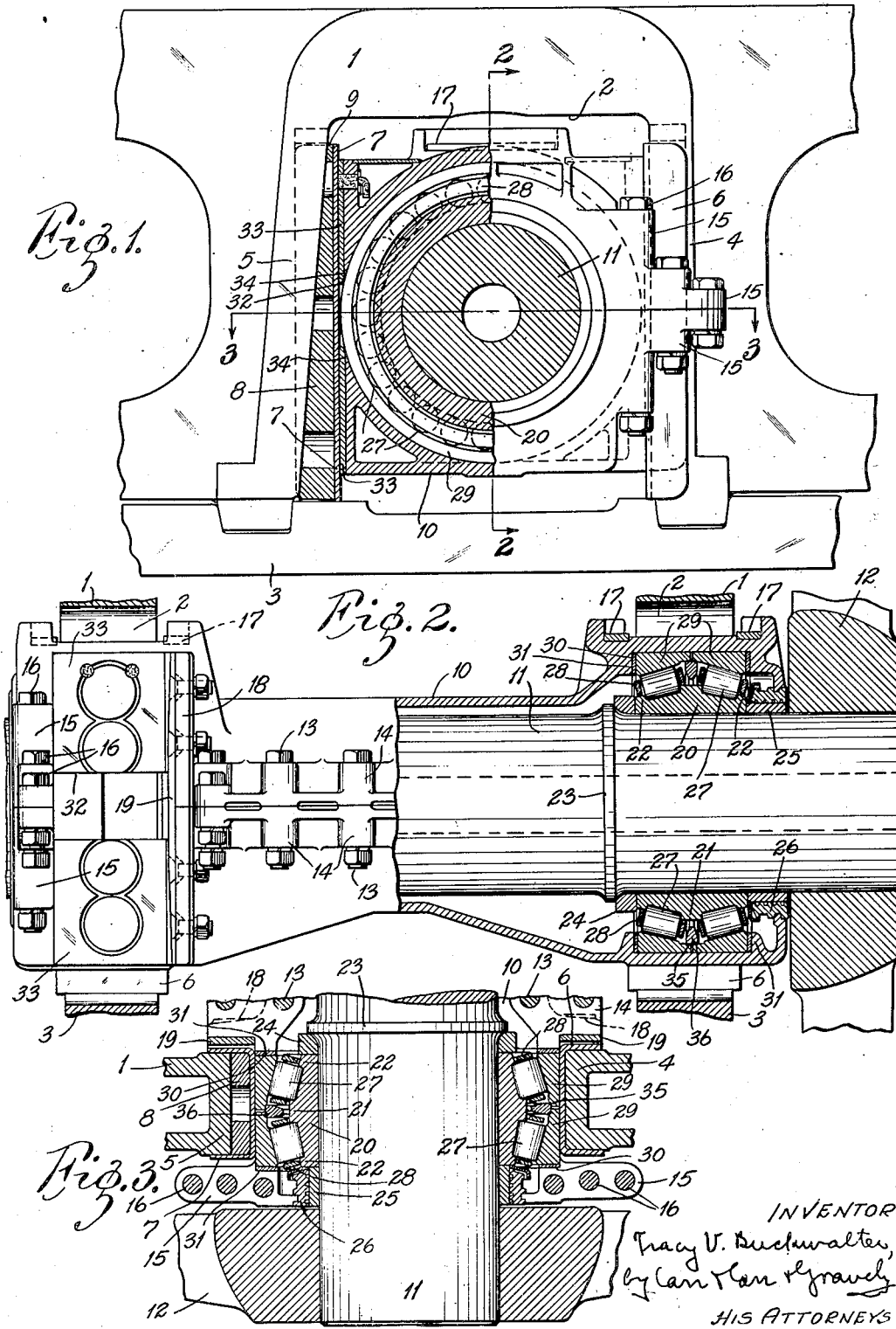

UNITED STATES PATENT OFFICE 1,967,807

RAILWAY TRUCK CONSTRUCTION

Tracy V. Buckwalter, Canton, Ohio, assignor to The Timken Roller Bearing Company, Canton, Ohio, a corporation of Ohio Application February 18, 1933, Serial No. 657,362

9 Claims. (Cl. 308—130)

My invention relates to railway trucks, particularly to the axle housing and bearing parts thereof. It is extremely difficult to install roller bearings in conventional railway truck frames adapted for plain bearings due to the increased size of the roller bearings over the plain ones. This is particularly true in the case of integrally cast locomotive truck frames wherein it is impracticable to make the frame openings large enough to accommodate the usual type of roller bearing axle housing assemblies.

The principal object of this invention is to provide a roller bearing axle housing assembly for a railway truck, which assembly will be able to withstand the stresses encountered during operation of the truck, but which will be narrower in width than the usual type of such assemblies so that it can be installed in a plain bearing truck frame without widening the axle openings thereof.

The present invention is particularly applicable to the type of construction described and claimed in my co-pending in application Serial No. 619,879 for an improvement in railway truck construction. In this type of construction, the axle housing has openings in its side for accommodating the side portions of the outer bearing members or cups for reducing the width of the bearing. The present invention consists principally in a roller bearing axle housing assembly of this general type that has a special supporting ring engaging the inner periphery of the bearing cups for reinforcing them in the vicinity of the openings in the sides of the axle housing. The invention further consists in a railway truck that has the bearings located in such position that parts thereof extend beyond the face of the side frame member of the truck and the axle housing extends all the way around the outer periphery of the extended parts of the bearings. With this arrangement, the openings through the sides of the axle housing are made only large enough to receive the side portions of the bearing parts that lie within the side frame opening. The invention further consists in the parts and combinations and arrangement of parts hereinafter described and claimed.

In the accompanying drawings which form part of this specification and wherein like reference numerals refer to like parts wherever they occur, Fig. 1 is an end view of a roller bearing axle housing assembly embodying my invention, the assembly being mounted in the side frame opening of a conventional railway truck with the axle, and with parts of the bearing and of the housing shown in vertical section, Fig. 2 is a sectional view along the line 2—2 in Fig. 1, with a portion of the axle housing shown in side elevation, Fig. 3 is a section along the line 3—3 in Fig. 1, Fig. 4 is an end view similar to Fig. 1 of a modification, Fig. 5 is a sectional view along the line 5—5 in Fig. 4, with a portion of the axle housing shown in side elevation, and Fig. 6 is a view along the line 6—6 in Fig. 4.

In Figs. 1 to 3, inclusive, of the drawings is shown a part of a conventional locomotive side truck frame 1 having an axle opening 2 defined by pedestals whose bottoms are connected by a pedestal tie member 3. The pedestal 4 on one side of the opening extends vertically whereas the pedestal 5 on the other side thereof is inclined to make the opening wider at its bottom. The vertical pedestal 4 has a channel-shaped frame liner 6 fitted around it. The inclined pedestal 5 has a similar channel-shaped frame liner 7 fitted around it with a perforated wedge-shaped block 8 interposed between the web of the frame liner and the pedestal and welded thereto so that the wear face of the frame liner extends vertically. The frame liners rest on the top of the pedestal tie member; and holder blocks 9 are welded to the sides of the pedestals above the top of the liners for preventing vertical displacement thereof.

A tubular housing 10, enclosing an axle 11 with a wheel 12 fixed on its end, is mounted in the side frame opening 2. The housing 10 is quite similar to that disclosed in my co-pending application hereinabove referred to; it is split along its horizontal center line, and the two half sections thereof are held together by bolts 13 extending through oppositely disposed lugs 14 along the adjoining edges of the two half sections of the housing. The ends of the two half sections of the housing outside the truck side frame have stepped flange portions 15 projecting laterally outward from each side thereof with a series of bolts 16 extending through them for firmly securing the outer end portions of the two half sections of the housing together. The top of the housing on each side of the side frame member, respectively, is provided with seats 17 for equalizer bars (not shown); and the sides of the housing have lateral flanges 18 that support thrust blocks 19 adapted to engage the inside flanges of the frame liners 7 for preventing excessive transverse movement of the axle housing with respect to the truck frame.

Mounted on the axle in the end of the housing is an inner bearing member or cone 20 having its large diameter at its middle and having its raceways bordered by a central annular thrust rib 21 and positioning ribs 22 at its ends. The axle has an annular abutment rib 23 adjacent to the inner end of the cone, and a spaced ring 24 is mounted on the axle between the abutment rib 23 and the cone with its respective ends abutting against the side of the rib and the end of the cone. A sleeve 25 is mounted on the axle between the wheel and the cone with its inner end abutting against the adjacent end of the cone. Mounted around this sleeve is an enclosure ring 26 having its outer periphery engaging the wall of the axle opening through the end of the axle housing. Mounted around the raceways of the cone are circular sets of rollers 27 mounted in suitable cages 28. Seated in the housing and mounted around the rollers are outer bearing members or cups 29. These cups have their large ends abutting against flat adjusting rings 30 that abut against annular shoulders 31 provided in the axle housing; and the sides of the axle housing have rectangular openings 32 into which the outer side portions of the bearing cups project.

Interposed between each frame liner and the adjacent side of the axle housing, above and below the rectangular opening therethrough, respectively, are flat wear plates 33 that are secured to the housing as by welding 34. There is a slight clearance space provided between the small ends of the two bearing cups; and the cups have annular recesses in their inner peripheries at their small ends that mate with each other to form an annular groove 35 between the two cups. Disposed in this groove is an annular supporting ring 36.

In Figs. 4 to 6, inclusive, is shown a modified form of a roller bearing axle housing assembly embodying my invention. The modified construction is shown installed in a different type of railway truck frame from that in which the preferred form is installed. The side frame 1a has an axle opening 2a therein that is defined by vertically disposed pedestal members 4a that are connected at their bottoms by a pedestal tie bar 3a. Fitted around the pedestals are channel-shaped liners 7a that are fixed to the pedestals as by pins 37 extending through the side flanges of the liners.

The modified form of roller bearing axle housing assembly that is mounted within the axle opening 2a in the side frame comprises an axle housing 10a that encloses the axle 11 with the wheel 12 fixed on its end with roller bearings interposed between the axle and the housing. The construction of the axle housing 10a and of the bearings is quite similar to the corresponding parts of the preferred form. However, in the modified form, the bearings are located closer to the wheel than in the preferred form, the vertical center line of the bearings being offset at such distance from the vertical center line of the side frame that the outermost part of the bearing cup located adjacent to the wheel extends beyond the face of the side frame where the axle housing extends all the way around; and the openings 32a through the respective sides of the axle housing are made just wide enough to receive the side portions of the innermost bearing cup and the sides of the part of the outermost cup that is located inside the side frame opening.

In the constructions hereinabove described, there is ample surface contact between the pedestal liners and the wear plates at the sides of the axle housing above and below the openings therein to provide for a stable condition of the axle housing. Furthermore, even though the bearing cups are not completely backed up at their sides, they are sufficiently reinforced by the inner supporting ring which fits tightly in their grooved ends that they are capable of withstanding shock loads imposed upon them at their sides; and in this connection, it is important to note that the principal load imposed upon the bearings of a railway truck axle is exerted on the bearing parts above and below the axle and that such parts receive considerably more radial load than those at the sides of the axle.

In the modified form of invention, by locating the bearings close to the wheel, the outermost part of the bearing cup adjacent to the wheel is completely backed up by the axle housing, and the openings through the sides of the axle housing are comparatively narrow so that the weakening effect of such openings on the axle housing, if any, is extremely slight. Obviously, this form of the invention is preferably used where there is sufficient clearance between the wheels and the side frames to allow the bearings to be placed close to the wheel.

Obviously, the hereinabove described constructions admit of considerable variations without departing from the scope of the invention. Accordingly, I do not wish to be limited to the precise constructions shown and described.

What I claim is:

1. The combination of a railway truck frame having an opening therein, a housing in said opening, the top of said housing being formed for cooperation with an equalizer member, an axle in said housing, roller bearings including a bearing cup interposed between said housing and said axle, said housing having an opening in its side into which opening projects the outer side portion of said bearing cup, said frame extending across said opening in said housing and the outside diameter of said bearing cup being less than the width of said truck opening and means around the inner periphery of said bearing cup for reinforcing it.

2. The combination of a railway truck frame having an opening therein, a housing in said opening, the top of said housing being formed for cooperation with an equalizer member, an axle in said housing, roller bearings including a bearing cup interposed between said housing and said axle, said housing having an opening in its side into which opening projects the outer side portion of said bearing cup, said frame extending across said opening in said housing and the outside diameter of said bearing cup being less than the width of said truck opening and a supporting ring engaging the inner periphery of said cup.

3. The combination of a railway truck frame having an opening therein, a housing in said opening, the top of said housing being formed for cooperation with an equalizer member, an axle in said housing, roller bearings including a pair of bearing cups interposed between said axle and said housing, said housing having an opening in its side into which opening project the outer side portions of said bearing cups, said frame extending across said opening in said housing and the outside diameter of said bearing cup being less than the width of said truck opening and a ring along the inner periphery of said bearing cups at their ends facing each other for reinforcing them.

4. The combination of a railway truck frame having an opening therein, a housing in said opening, the top of said housing being formed for cooperation with an equalizer member, an axle in said housing, roller bearings interposed between said axle and said housing, said roller bearings including a pair of abutting bearing cups having their abutting ends provided with annular recesses that mate with each other to form an annular groove, and a supporting ring disposed in said groove, said axle housing having openings in its respective sides into which openings project the outer side portions of said bearing cups, said frame extending across said opening in said housing and the outside diameter of said bearing cup being less than the width of said truck opening.

5. The combination of a railway truck frame having an opening therein, a housing in said opening, the top of said housing being formed for cooperation with an equalizer member, an axle in said housing, roller bearings interposed between said axle and said housing, said roller bearings including a pair of abutting bearing cups having their abutting ends provided with annular recesses that mate with each other to form an annular groove, said housing having a shoulder adjacent to the outer end of each cup, an adjustment ring interposed between each shoulder and the end of the adjacent cup, and a supporting ring disposed in the groove of the cups, and said axle housing having openings in its respective sides into which openings project the outer side portions of said bearing cups, said frame extending across said opening in said housing and the outside diameter of said bearing cup being less than the width of said truck opening.

6. The combination of a railway truck side frame having an opening therein, a housing extending through said opening, an axle in said housing, and roller bearings interposed between said axle and said housing with parts of the bearings located beyond the outer face of the side frame, the outside diameter of said bearing being smaller than the width of said frame opening, said housing having an opening in its side into which opening projects the outer side portion of the parts of the bearings within the side frame opening.

7. The combination of a railway truck side frame having an opening therein, a housing extending through said opening, an axle in said housing, and roller bearings including a bearing cup interposed between said axle and said housing with a part of the cup located beyond the outer face of the side frame, the outside diameter of said cup being smaller than the width of said frame opening, said housing having an opening in its side into which opening projects the outer side portion of the part of the bearing cup within the side frame opening.

8. The combination of a railway truck side frame having an opening therein, a housing extending through said opening, an axle in said housing and roller bearings including a pair of bearing cups interposed between said axle and said housing with the outermost part of the outermost bearing cup located beyond the outer face of the side frame, the outside diameter of said cup being smaller than the width of said frame opening, said housing having an opening in its side into which opening projects the innermost bearing cup and the innermost part of the outermost bearing cup.

9. The combination of a railway truck side frame having an opening therein, a housing extending through said opening, an axle in said housing, roller bearings including a pair of bearing cups interposed between said axle and said housing with part of the outermost bearing cup located beyond the outer face of the side frame, the outside diameter of said cup being smaller than the width of said frame opening, said housing having an opening in its side into which opening projects the side portion of the innermost bearing cup and the part of the outermost bearing cup located within the side frame opening, and a supporting ring engaging the inner peripheries of said bearing cups for reinforcing them.

TRACY V. BUCKWALTER.